2,826,040

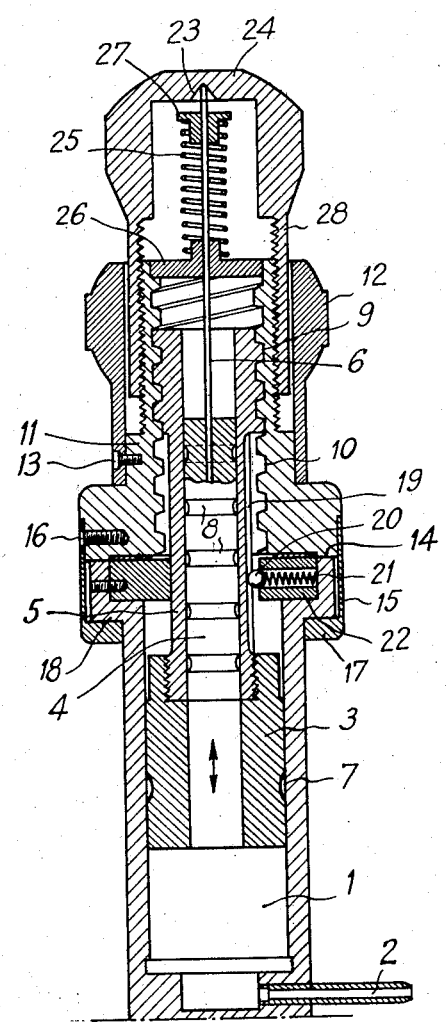

APPARATUS FOR THE CONTROL OF DISPLACEMENTS OF FLUID

Pierre Henry Dussumier de Fonbrune, Versailles, and Paul André Beaudouin, Paris, France Application July 7, 1954, Serial No. 441,912

Claims priority, application France July 10, 1953

5 Claims. (Cl. 60—54.6)

The subject of the invention is an apparatus for controlling the displacements of fluid.

More particularly the invention relates to such apparatus for the control of micro-manipulators comprising manometric capsules, into which fluid is to be sent or from which fluid is to be withdrawn to effect deformations of one or more walls of the manometric capsules and thus to vary the position of the micro-tool connected to the capsules.

The apparatus according to the invention is of course also suited for other industrial uses. Its particular feature is the provision of means to permit the making independently of large or small displacements of fluid.

In control apparatus now used for micro-manipulators, one meets with disadvantages due to the fact that the apparatus does not permit large differences in the rapidity of fluid flow. The apparatus is either too sensitive and takes a long time to effect relatively large displacements or it is not sufficiently sensitive, which makes very difficult the manipulation of very small objects placed under the objective of the microscope.

The apparatus according to the invention permits rapid approaching or withdrawal of the micro-tool, as well as the extremely slow and precise movements needed in displacing the objects to be examined under the objective of the microscope.

It has the further advantage of occupying an extremely restricted space, which is of particular importance in laboratories.

The apparatus according to the invention is of the type comprising a cylinder in communication with at least one pipe and a piston moving in this cylinder for ejecting the fluid contained in it or for sucking fluid into it.

According to the invention the piston is composed of at least two telescopic parts controlled separately.

The rod of the largest part can, for example, be threaded along a portion of its length and can be controlled by a threaded holder rotating without translation in relation to the body of the apparatus, means being provided for preventing the rod of this part from being rotated by the rotation of the holder.

The means preventing rotation can, according to one embodiment, comprise a tenon, which may be elastic or not, joined to the body of the apparatus and located in a longitudinal groove formed in the non-threaded portion of the rod of the largest part.

The holder may be provided with an outer thread on which is screwed a cap, the lower part of the cap serving as a stop for a control rod of the smallest part.

The pitches of the screw of the holder and of the cap may be different.

Finally a spring may be supported on the body of the apparatus and on a portion of the control rod of the smallest part.

The invention will now be described in more detail in connection with a specific embodiment given by way of example and shown in the drawing in longitudinal section.

The apparatus illustrated comprises a cylinder 1, communicating at its lower end with a pipe 2, which can, for example, be connected with a manometric control capsule of the micro-tool of a micro-manipulator (not shown).

According to the invention there is disposed in the cylinder 1 a telescopic piston comprising a part 3 of large diameter and a part 4 of smaller diameter. The part 4 may slide in relation to the part 3 or it may be driven with it.

Each part is controlled by means of a rod. The control rod 5 of the part 3 is hollow and serves as a guide for the part 4. The control rod 6 of the part 4 extends upwardly to its controlling element 24 which will be described in detail below.

The grooves 7 and 8 which are provided on the circumference of the parts 3 and 4, respectively, serve to retain lubricant and to ensure the tightness of the apparatus.

The upper portion of rod 5 is threaded at 9 and is engaged in the thread 10 of a holder 11 secured to a control sleeve 12, which is preferably milled on its exterior surface. The sleeve 12 is secured to holder 11 by the screws 13. The holder 11 rotates in relation to the upper portion of the cylinder 1 with which it is in contact along the plane 14. The holder 11 is kept in position on the cylinder by an apron 15 secured to the holder 11 by means of screws 16 and comprising an angle piece 17 supported on a shoulder 18 of the cylinder. The holder 11 can thus turn relatively to the cylinder 1 without being subjected to longitudinal movements along the axis of the cylinder.

The rod 5 is formed with a groove 19 into which penetrates a ball 20 elastically urged into the groove by a spring 21. The ball 20 and the spring 21 are disposed in a seat 22 in the upper portion of cylinder 1. The engagement of ball 20 in groove 19 ensures longitudinal movement of the rod 5 while preventing any rotation movement of that rod.

As a result of this construction, when the sleeve 12 is rotated, concurrent rotation of holder 11 is effected and rod 5 ascends or descends, depending upon the direction of rotation, and lower part 3 of the piston is similarly moved.

The lower surface of part 3 and the screw pitch between elements 9 and 11 can be calculated to produce relatively great displacements of the fluid contained in the cylinder 1.

Upper part 4 of the piston may have a horizontal section which is much smaller than the active surface of the lower part 3 and is controlled by the rod 6, which is supported in an aperture 23 in the lower face of a cap 24. The rod 6 is constantly urged upwardly by a spring 25 which is supported on a plate 26 secured to the upper part of the holder 11 and on a stop 27 secured to rod 6.

The cap 24 is extended downwardly by a threaded apron 28 which is internally threaded to mesh with a corresponding thread on the upper portion of holder 11.

By rotating the cap 24 one can thus cause the upper part 4 of the piston to descend or ascend relatively to the holder 11 and without moving lower part 3. It is thus possible to control small displacements of the fluid in the cylinder. This control will come into action, for example, when one desires to move a small object under the objective of a microscope by means of a micro-manipulator.

It is to be observed that the spring 25 continuously pushes the cap 24 upwardly so that the same surface of the internal thread of cap 24 constantly bears on a similar surface of the thread provided on the upper portion of the holder 11. One thus obtains an automatic compensation of any play which may tend to exist between the threading of the apron of the cap 24 and the threading of the holder 11. The precision of the movements of the micro-tool is thus improved.

It is to be understood that the invention is not limited by the specific embodiment which has just been described. Modifications of details in the disposition and the control of the telescopic parts of the piston may be made without departing from the invention. These parts could, for example, exceed two in number. One could provide a succession of combined telescopic parts, each with an independent control. The apparatus, moreover, is not limited to use with a micro-manipulator.

We claim:

1. An apparatus for controlling the displacements of a fluid which comprises, in combination, means defining a cylinder having an outlet for the fluid, a hollow first piston slidable in said cylinder and having a coaxial hollow stem, at least a portion of said stem being externally threaded, means for preventing rotation of said stem and its associated piston in said cylinder, sleeve means surrounding said stem and mounted for rotation relatively to said cylinder, said sleeve means having internal threads engaging the threaded portion of said stem and having external threads, a second piston axially movable in said hollow stem of said hollow first piston, said second piston having a stem extending axially therefrom away from said first piston, and means threadedly engageable with the external threads of said sleeve means for acting on said second piston stem to move said stem axially.

2. An apparatus for controlling the displacements of a fluid which comprises, in combination, means defining a cylinder having an outlet for the fluid, a hollow first piston slidable in said cylinder and having a coaxial hollow stem, at least a portion of said stem being externally threaded and a portion of said stem being formed with an external longitudinal groove, detent means engaged in said groove for preventing rotation of said stem and its associated piston in said cylinder but leaving said stem free for axial movement, sleeve means surrounding said stem and mounted for rotation relatively to said cylinder, said sleeve means having internal threads engaging the threaded portion of said stem and having external threads, a second piston axially movable in said hollow stem of said hollow first piston, said second piston having a stem extending axially therefrom away from said first piston, and means threadedly engageable with the external threads of said sleeve means for acting on said second piston stem to move said stem axially.

3. An apparatus for controlling the displacements of a fluid which comprises, in combination, means defining a cylinder having an outlet for the fluid, a hollow first piston slidable in said cylinder and having a coaxial hollow stem, at least a portion of said stem being externally threaded, means for preventing rotation of said stem and its associated piston in said cylinder, sleeve means surrounding said stem and mounted for rotation relatively to said cylinder, said sleeve means having internal threads engaging the threaded portion of said stem and having external threads, a second piston axially movable in said hollow stem of said hollow first piston, said second piston having a stem extending axially therefrom away from said first piston, and means threadedly engageable with the external threads of said sleeve means for acting on said second piston stem to move said stem axially, said last-named means comprising a cap formed internally with a socket receiving the free end of said second piston stem.

4. An apparatus for controlling the displacements of a fluid which comprises, in combination, means defining a cylinder having an outlet for the fluid, a hollow first piston slidable in said cylinder and having a coaxial hollow stem, at least a portion of said stem being externally threaded, means for preventing rotation of said stem and its associated piston in said cylinder, sleeve means surrounding said stem and mounted for rotation relatively to said cylinder, said sleeve means having internal threads engaging the threaded portion of said stem and having external threads, a second piston axially movable in said hollow stem of said hollow first piston, said second piston having a stem extending axially therefrom away from said first piston, and cap means threadedly engageable with the external threads of said sleeve means for acting on said second piston stem to move said stem axially, the pitch of the thread between said cap means and said sleeve means being different from the pitch of the thread between said sleeve means and said hollow stem.

5. An apparatus for controlling the displacements of a fluid which comprises, in combination, means defining a cylinder having an outlet for the fluid, a hollow first piston slidable in said cylinder and having a coaxial hollow stem, at least a portion of said stem being externally threaded, means for preventing rotation of said stem and its associated piston in said cylinder, sleeve means surrounding said stem and mounted for rotation relatively to said cylinder, said sleeve means having internal threads engaging the threaded portion of said stem and having external threads, a second piston axially movable in said hollow stem of said hollow first piston, said second piston having a stem extending axially therefrom away from said first piston, means threadedly engageable with the external threads of said sleeve means for acting on said second piston stem to move said stem axially, and spring means normally urging the stem of said second piston in a direction away from said first piston.

References Cited in the file of this patent

UNITED STATES PATENTS

| 1,120,717 | Hogan | Dec. 15, 1914 |

FOREIGN PATENTS

| 3,498 | Great Britain | Sept. 4, 1878 |
| 619,490 | Germany | Oct. 1, 1935 |